(12) United States Patent
Han et al.

(10) Patent No.: US 9,456,147 B2
(45) Date of Patent: Sep. 27, 2016

(54) VIDEO GENERATING SYSTEM WITH MULTIPLE IMAGE SENSORS AND RELATED METHOD THEREOF

(71) Applicant: PixArt Imaging Inc., Hsin-Chu (TW)

(72) Inventors: Chih-Kang Han, Hsin-Chu (TW); En-Feng Hsu, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 0 days.

(21) Appl. No.: 14/703,869

(22) Filed: May 4, 2015

(65) Prior Publication Data

US 2015/0237267 A1   Aug. 20, 2015

Related U.S. Application Data

(62) Division of application No. 13/925,840, filed on Jun. 25, 2013, now Pat. No. 9,210,449.

(30) Foreign Application Priority Data

Jan. 8, 2013 (TW) .............................. 102100621 A

(51) Int. Cl.
*H04N 5/247* (2006.01)
*H04N 5/225* (2006.01)

(52) U.S. Cl.
CPC ............ *H04N 5/247* (2013.01); *H04N 5/2258* (2013.01)

(58) Field of Classification Search
CPC .................... H04N 5/23238; H04N 5/23232; H04N 5/247; H04N 5/2258
See application file for complete search history.

(56) References Cited

U.S. PATENT DOCUMENTS

| | | |
|---|---|---|
| 5,850,253 A | 12/1998 | Inoue |
| 2004/0150728 A1 | 8/2004 | Ogino |
| 2007/0263071 A1 | 11/2007 | Lee |
| 2012/0194712 A1 | 8/2012 | Crook |
| 2013/0307924 A1 | 11/2013 | Cho |

FOREIGN PATENT DOCUMENTS

TW   201143368   12/2011

*Primary Examiner* — Tuan Ho
(74) *Attorney, Agent, or Firm* — Winston Hsu; Scott Margo

(57) ABSTRACT

A video generating system includes: a plurality of image sensors, arranged to generate a plurality of images and a plurality of synchronization signals corresponding to the images; a combining circuit, coupled to the image sensors, arranged to generate a plurality of output images according to the images, and generate a plurality of output synchronization signals corresponding to the output images according to the synchronization signals; and a bus, coupled between the image sensors and the combining circuit, arranged to perform signal transmission. The image sensors comprise a first image sensor and a second image sensor; and when the combining circuit receives image data of at least a first image generated by the first image sensor, the combining circuit does not receive image data of at least a second image generated by the second image sensor at the same time.

5 Claims, 16 Drawing Sheets

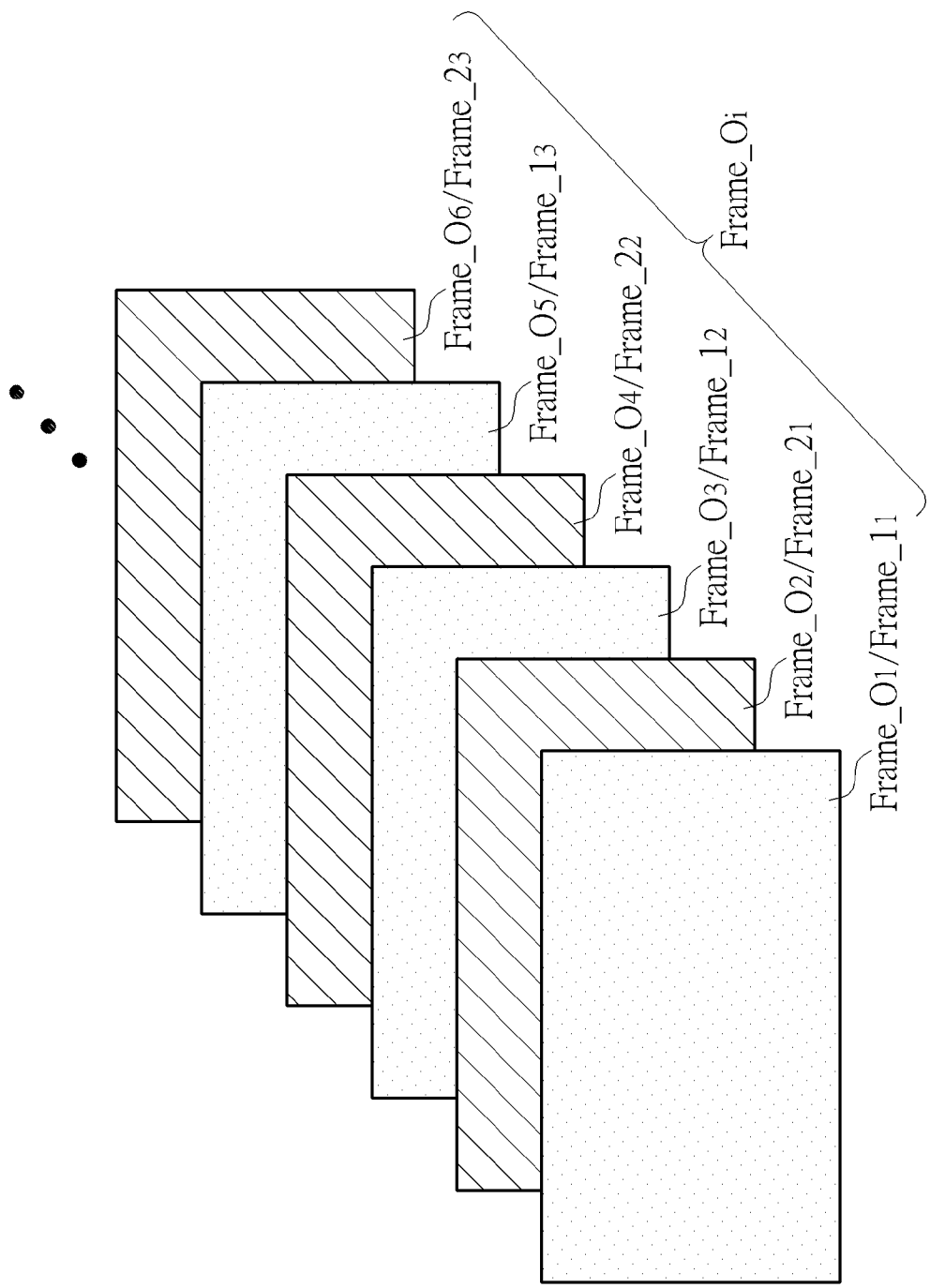

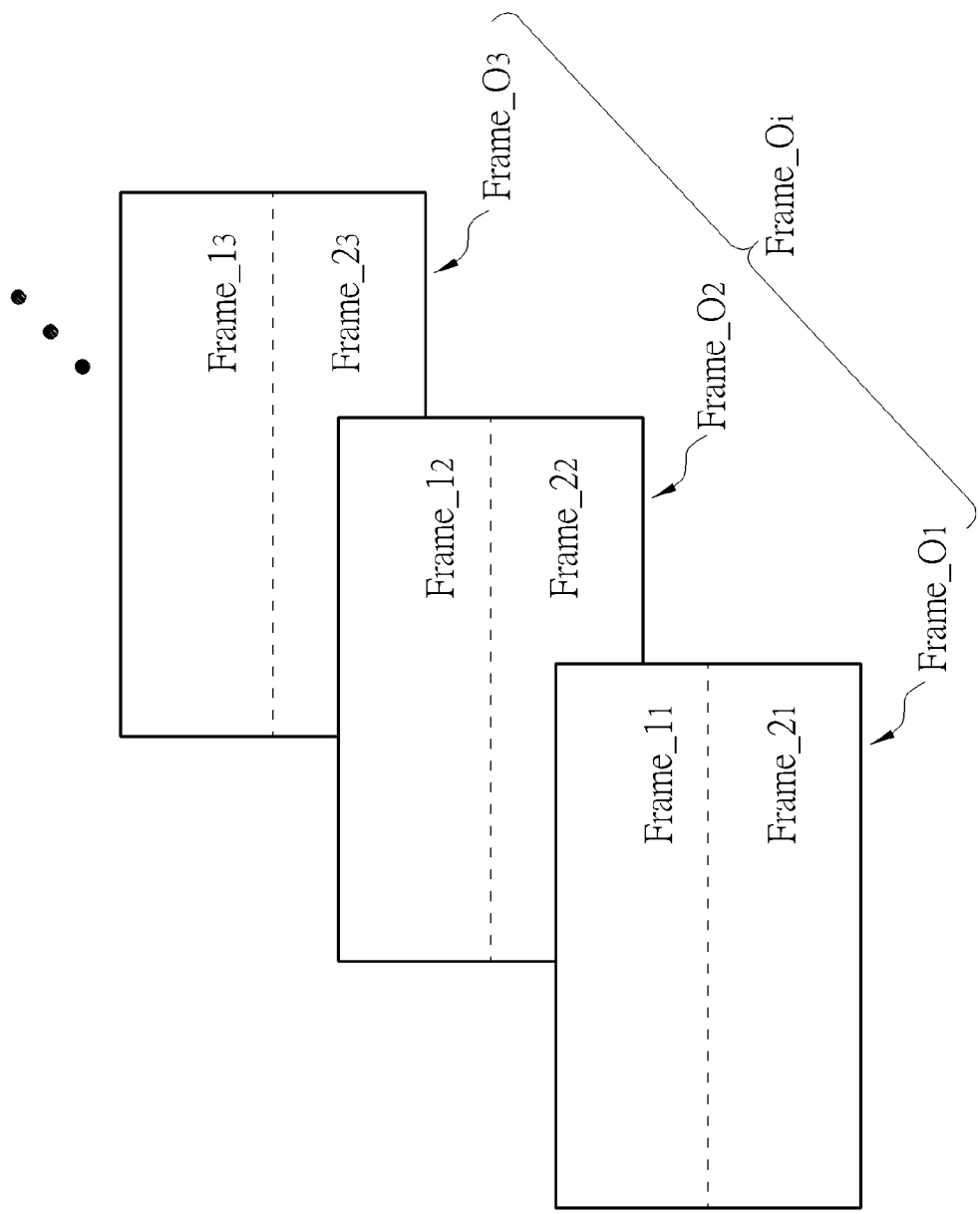

VIDEO GENERATING SYSTEM WITH MULTIPLE IMAGE SENSORS AND RELATED METHOD THEREOF

CROSS REFERENCE TO RELATED APPLICATIONS

This application is a divisional of application Ser. No. 13/925,840 filed Jun. 25, 2013, which is incorporated by reference herein in its entirety.

BACKGROUND OF THE INVENTION

1. Field of the Invention

The disclosed embodiments of the present invention relate to video processing, and more particularly, to a video generating system for combining images generated from a plurality of image sensors and related method thereof.

2. Description of the Prior Art

A video generating system with multiple image sensors performs video capture upon the same or different scenes at different angles, positions or distances, thereby providing rich and complete video information. This kind of video generating system needs a back-end circuit for combining different images from different image sensors to generate an output image satisfying user's requirement.

Conventionally, each image sensor transmits its own image data and synchronization signal to the back-end circuit via its own dedicated signal transmission interface, and then the back-end circuit would combine these image data according to the synchronization signals to generate an output image. Regarding such a conventional architecture, please refer to a video generating system shown in FIG. 1. In the video generating system 100, a back-end circuit 130 is arranged for generating an output image by combining an image A and an image B generated from a image sensor 110 and a image sensor 120 respectively. The image sensors 110 and 120 transmit the synchronization signals and image data via respective dedicated signal transmission interfaces 115 and 125. Taking the signal transmission interface 115 for example, it includes a vertical synchronization signal line VSYNC1, a horizontal synchronization signal line HSYNC1, a pixel clock signal line PXCLK1, and a pixel data signal line PXD1. Also, the signal transmission interface 125 has a similar configuration of signal lines.

However, the number of signal transmission interfaces needed by such a signal transmission scheme mentioned above is positively proportional to the number of image sensors. Similarly, the number of input pins of the back-end circuit 130 is also positively proportional to the number of signal transmission interfaces. Moreover, since signals generated by different image sensors are transmitted to the back-end circuit 130, the back-end circuit 130 needs a memory to buffer the received image data and performs re-permutation and re-combination upon the received image data. As a result, the complexity of the video generating system 100 is increased greatly as the number of image sensors is increased, and the back-end circuit 130 needs to be equipped with powerful computation capability and large buffer memory capacity.

SUMMARY OF THE INVENTION

In order to avoid the complicated circuit architecture of the conventional video generating system, the present invention therefore proposes a bus based transmission architecture which allows the signal transmission interface to be shared in a time-sharing manner. Besides, the present invention further controls the output timing of the signals of the image sensors through synchronization signals, thereby allowing the back-end circuit to be free of the buffer memory. By arranging the transmission sequence of the image data in advance, the combining circuit of the present invention does not need to reintegrate and reorganize the images, but outputting the images instantly while receiving the images. In this way, the present invention can also generate all kinds of output images.

According to an embodiment of the present invention, a video generating system is disclosed. The video generating system includes The video generating system comprises: a plurality of image sensors, arranged to generate a plurality of images and a plurality of synchronization signals corresponding to the images; a combining circuit, coupled to the image sensors, arranged to generate a plurality of output images according to the images, and generate a plurality of output synchronization signals corresponding to the output images according to the synchronization signals; and a bus, coupled between the image sensors and the combining circuit, arranged to perform signal transmission. The image sensors comprise a first image sensor and a second image sensor; and when the combining circuit receives image data of at least a first image generated by the first image sensor, the combining circuit does not receive image data of at least a second image generated by the second image sensor at the same time.

According to another embodiment of the present invention, a video generating method is disclosed. The video generating method comprises: a plurality of image sensors, arranged to generate a plurality of images and a plurality of synchronization signals corresponding to the images; a combining circuit, coupled to the image sensors, arranged to generate a plurality of output images according to the images, and generate a plurality of output synchronization signals corresponding to the output images according to the synchronization signals; a first bus, coupled between a first image sensor of the image sensors and the combining circuit, arranged to perform signal transmission; and a second bus, coupled between a second image sensor of the image sensors and the first image sensor, arranged to perform signal transmission between the first image sensor and the second image sensor. When the combining circuit receives image data of at least a first image generated by the first image sensor, the combining circuit does not receive image data of at least a second image generated by the second image sensor at the same time.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3A is a diagram illustrating an output image generating method of the video generation system according to the present invention.

FIG. 4A is a diagram illustrating another output image generating method of the video generation system according to the present invention.

DETAILED DESCRIPTION

Figure 1:
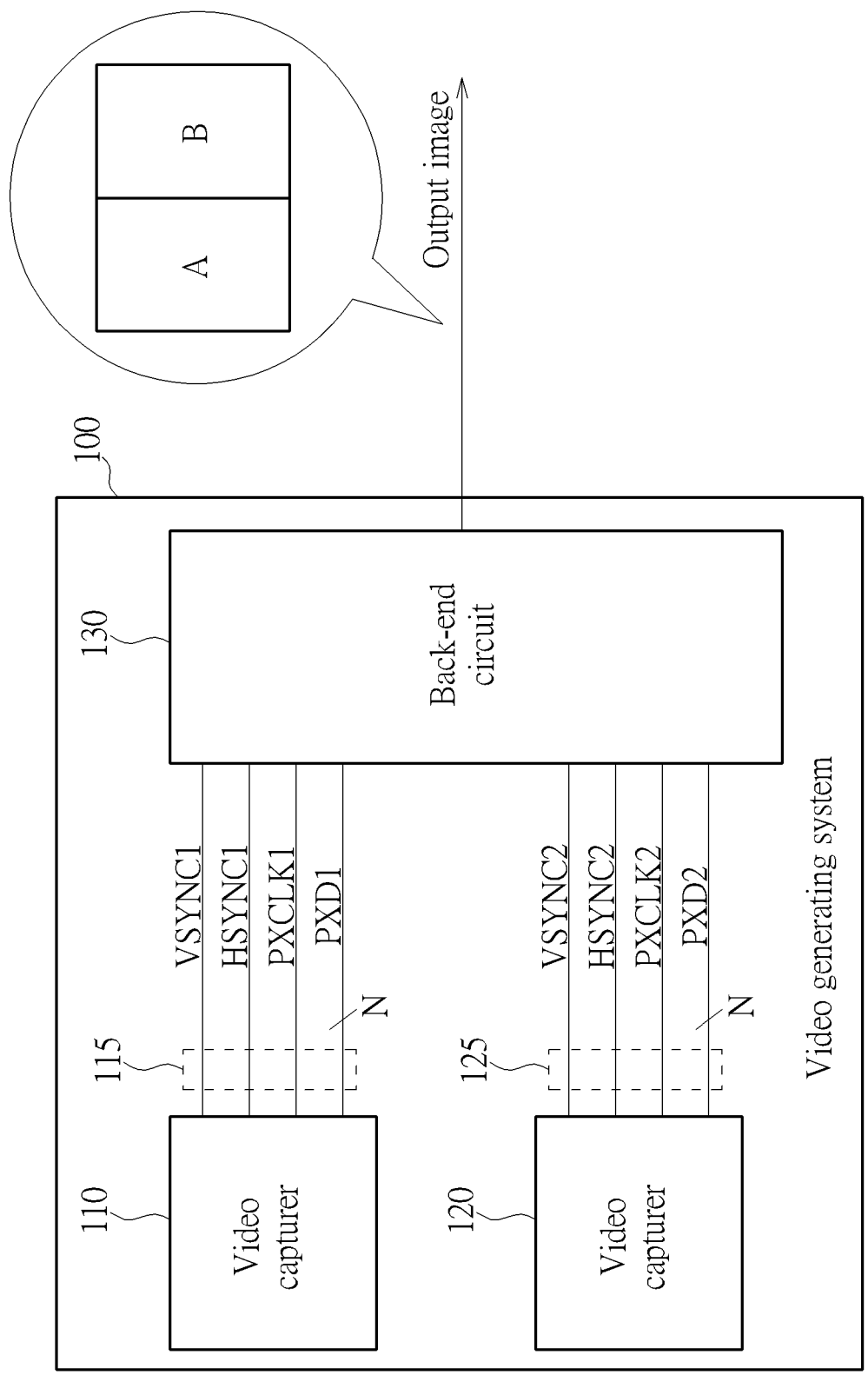
FIG. 1 is a diagram illustrating the conventional video generating system.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The video generating system of the present invention and the related method thereof will be explained by the following embodiments and drawings. These embodiments include modifications and alterations retaining the generalized concepts of the present invention, however, the contents of these drawings and embodiments should not be regarded as limitations the present invention. In addition, the components or symbols having the same reference numerals in the different figures should be regarded as having a similar meaning, function, or mode of operation.

Figure 2:
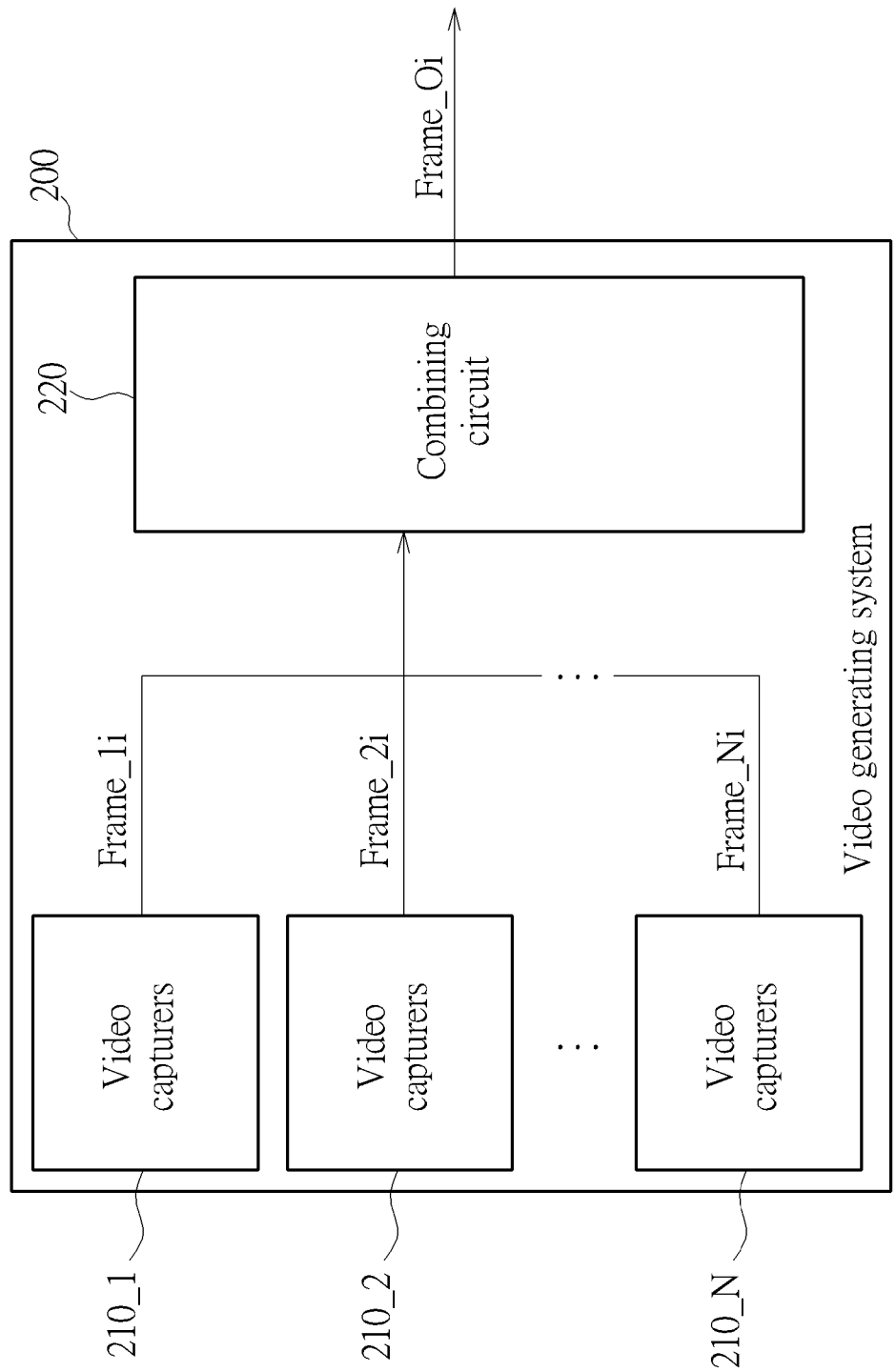
FIG. 2 is a diagram illustrating a video generating system according to an embodiment of the present.

Please refer to FIG. 2, which is a diagram illustrating video generating system according to an embodiment of the present. As shown in FIG. 2, the video generation system 200 includes a plurality of image sensors 210_1-210_N and a combining circuit 220. The image sensors 210_1-210_N are used to generate a plurality of images $Frame\_1_i$-$Frame\_N_i$ and a plurality of synchronization signals corresponding to the images $Frame\_1_i$-$Frame\_N_i$. The combining circuit 220 is coupled to the image sensors 210_1-210_N, and generates a plurality of output images $Frame\_O_i$ according to the images $Frame\_1_i$-$Frame\_N_i$ generated by the image sensors 210_1-210_N. Furthermore, the combining circuit 220 also generates a plurality of output synchronization signals corresponding to the output images according to the synchronization signals generated by the image sensors 210_1-210_N. Specifically, the first image sensor 210_1 generates a plurality of first images $Frame\_1_i$, and the second image sensor 210_2 generates a plurality of second images $Frame\_2_i$. When the combining circuit 220 is receiving (a portion or all of) the image data of an image $Frame\_1_i$ of the first images $Frame\_1_i$, the image data of the image $Frame\_2_i$ would not be received by the combining circuit 220 at the same time. As a result, the combining circuit 220 does not need to have an additional buffer memory or increase the capacity of the original buffer memory to buffer the images $Frame\_1_i$-$Frame\_N_i$. Instead, the combining circuit 220 receives image data and synchronization signals to produce the output images $Frame\_O_i$ and corresponding output synchronization signals by a proper arrangement of timing sequence of each image sensor on the signal transmission interface.

Figure 3B:
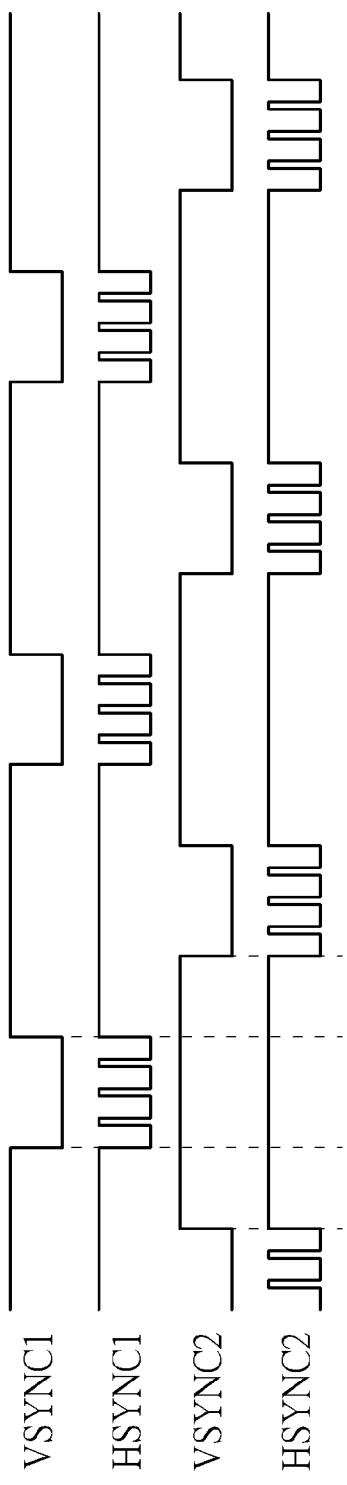
FIG. 3B is a diagram illustrating the timing relationship between the synchronization signals generated by the image sensor and the synchronization signals generated by the image sensor of the output image generating method shown in FIG. 3A.
Figure 3C:
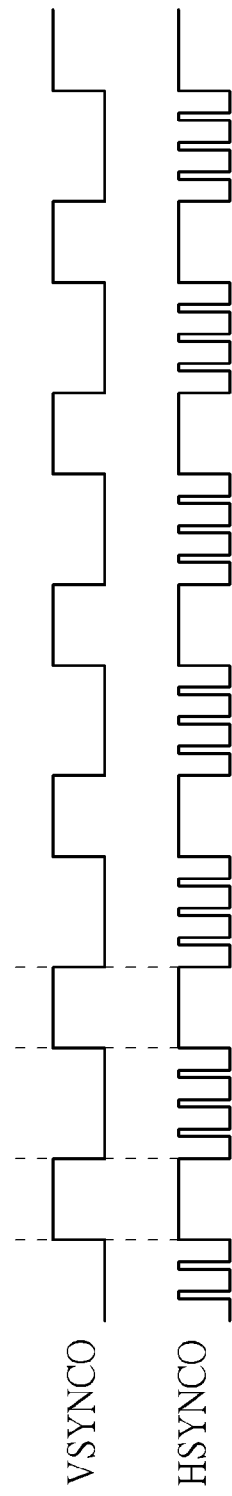
FIG. 3C is a diagram illustrating the output synchronization signals corresponding to the output images.

Please refer to FIG. 3A, which is a diagram illustrating an output image generating method of the video generation system according to the present invention, wherein the first images $Frame\_1_i$ generated by the image sensor 210_1 are arranged to be odd output images (e.g., $Frame\_O_1$, $Frame\_O_3$, $Frame\_O_5$, etc.) of the output images $Frame\_O_i$, and the second images $Frame\_2_i$ generated by the image sensor 210_2 are arranged to be even output images (e.g., $Frame\_O_2$, $Frame\_O_4$ $Frame\_O_6$ etc.) of the output images $Frame\_O_i$. FIG. 3B is a diagram illustrating the timing relationship between the synchronization signals VSYNC1 and HSYNC1 generated by the image sensor 210_1 and the synchronization signals VSYNC2 and HSYNC2 generated by the image sensor 210_2 according to the output image generating method shown in FIG. 3A. Since the combining circuit 220 starts to receive the second image $Frame\_2_i$ generated by the image sensor 210_2 after the first images $Frame\_1_i$ generated by the image sensor 210_1 is completely received, there is no horizontal/vertical synchronization pulse overlapping issue regarding the synchronization signals VSYNC1 and HSYNC1 as well as synchronization signals VSYNC2 and HSYNC2. FIG. 3C is a diagram illustrating the output synchronization signals VSYNCO and HSYNCO corresponding to the output images Frame_$O_i$. The combining circuit 220 arranges/utilizes the images Frame_$1_i$ as odd output images (e.g., Frame_$O_1$, Frame_$O_3$, Frame_$O_5$, etc.), and arranges/utilizes the images Frame_$2_i$ as even numbered output images (e.g., Frame_$O_2$ Frame_$O_4$, Frame_$O_6$ etc.). Therefore, the combining circuit 220 would produce the vertical synchronization signal VSYNCO and the horizontal synchronization signal HSYNCO with vertical and horizontal synchronization pulse lengths determined based on the horizontal and vertical synchronization pulse lengths of the synchronization signals VSYNC1 and HSYNC1 and the synchronization signals VSYNC2 and HSYNC2, such that vertical and horizontal synchronization pulse lengths of the synchronization signals VSYNCO, HSYNCO are equal to that of the synchronization signals VSYNC1, HSYNC1, VSYNC2 and HSYNC2. Furthermore, in this embodiment, the output images Frame_$O_i$, the images Frame_$1_i$ and the images Frame_$2_i$ have the same width and height.

Figure 4B:
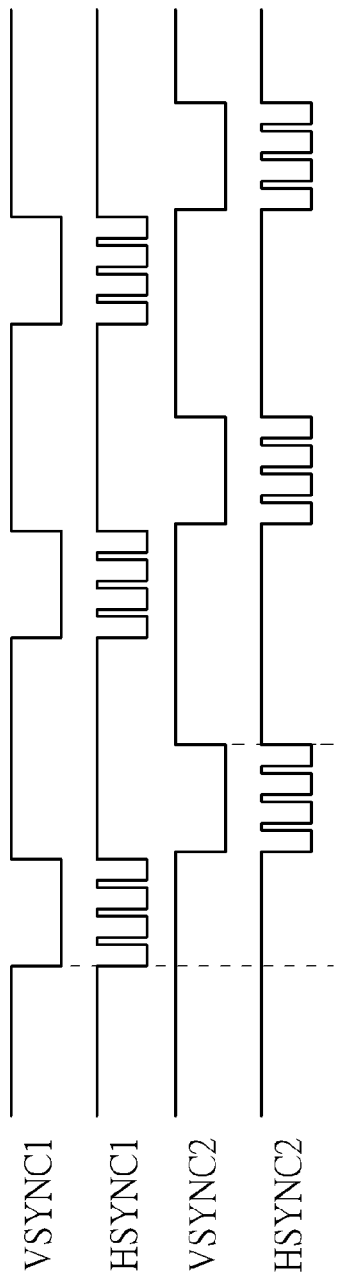
FIG. 4B is a diagram illustrating the timing relationship between the synchronization signals generated by the image sensor and the synchronization signals generated by the image sensor of the output image generating method shown in FIG. 4A.
Figure 4C:
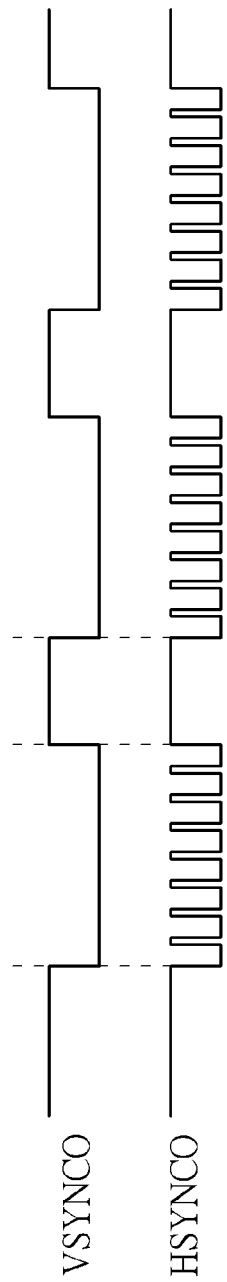
FIG. 4C is a diagram illustrating the synchronization signals corresponding to the output images.

Please refer to FIG. 4A, which is a diagram illustrating another output image generating method of the video generation system according to the present invention, wherein the first images Frame_$1_i$ generated by the image sensor 210_1 are arranged to be the upper halves (top halves) of the output images Frame_$O_i$, and the second images Frame_$2_i$ generated by the image sensor 210_2 are arranged to be the lower halves (bottom halves) of the output images Frame_$O_i$. FIG. 4B is a diagram illustrating the timing relationship between the synchronization signals VSYNC1 and HSYNC1 generated by the image sensor 210_1 and the synchronization signals VSYNC2 and HSYNC2 generated by the image sensor 210_2 of the output image generating method shown in FIG. 4A. Since the combining circuit 220 starts to receive the image Frame_$2_i$ generated by the image sensor 210_2 after the image Frame_$1_i$ generated by the image sensor 210_1 is completely received, the combining circuit 220, outputs the image Frame_$1_i$ as the upper half (top half) of the image Frame_$O_i$ while receiving it, and outputs the image Frame_$2_i$ as the lower half (bottom half) of the image Frame_$O_i$ while receiving it, there is no synchronization pulse overlapping issue regarding the synchronization signals VSYNC1 and HSYNC1 and synchronization signals VSYNC2 and HSYNC2, but the width of the synchronization pulse of the vertical synchronization signal VSYNCO of the image Frame_$O_i$ would be equal to the summation of the widths of the vertical synchronization signals VSYNC1 and VSYNC2 of the images Frame_$1_i$ and Frame_$2_i$. FIG. 4C is a diagram illustrating the synchronization signals VSYNCO and HSYNCO corresponding to the output images Frame_$O_i$. The width of the synchronization pulse of the horizontal synchronization signal HSYNCO of the output images Frame_$O_i$ is equal to the width of the synchronization pulse of the horizontal synchronization signal of the image Frame_$1_i$ or Frame_$2_i$. The combining circuit 220 generates the horizontal synchronization signal HSYNCO corresponding to the upper half (top half) of the output image Frame_$O_i$ by referring to the horizontal synchronization signal HSYNC1 of the image Frame_$1_i$, and generates the horizontal synchronization signal HSYNCO corresponding to the lower half (bottom half) of the output image Frame_$O_i$ by referring to the horizontal synchronization signal HSYNC2 of the image Frame_$2_i$. Moreover, the combining circuit 220 generate the synchronization pulse of the vertical synchronization signal VSYNCO of the output images Frame_$O_i$ in accordance with the start time of the synchronization pulse of the vertical synchronization signal VSYNC1 of the image Frame_$1_i$ and the end time of the synchronization pulse of the vertical synchronization signal VSYNC2 of the image Frame_$2_i$, and so on. In this example, the height of the output image Frame_$O_i$ is equal to the height of the image Frame_$1_i$ plus the height of the image Frame_$2_i$, and the widths of these three images are the same.

Figure 5A:
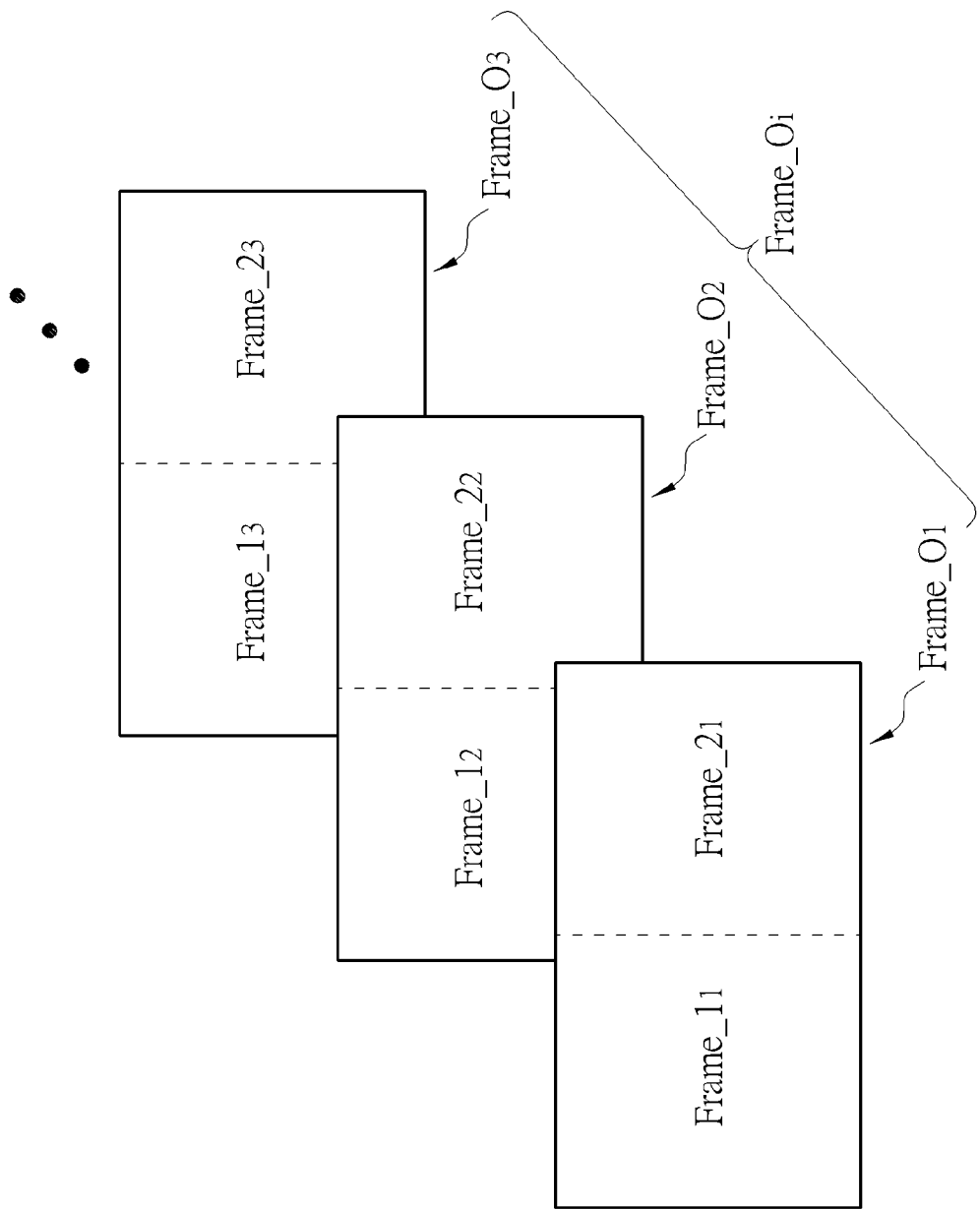
FIG. 5A is a diagram illustrating yet another output image generating method of the video generation system according to the present invention.
Figure 5B:
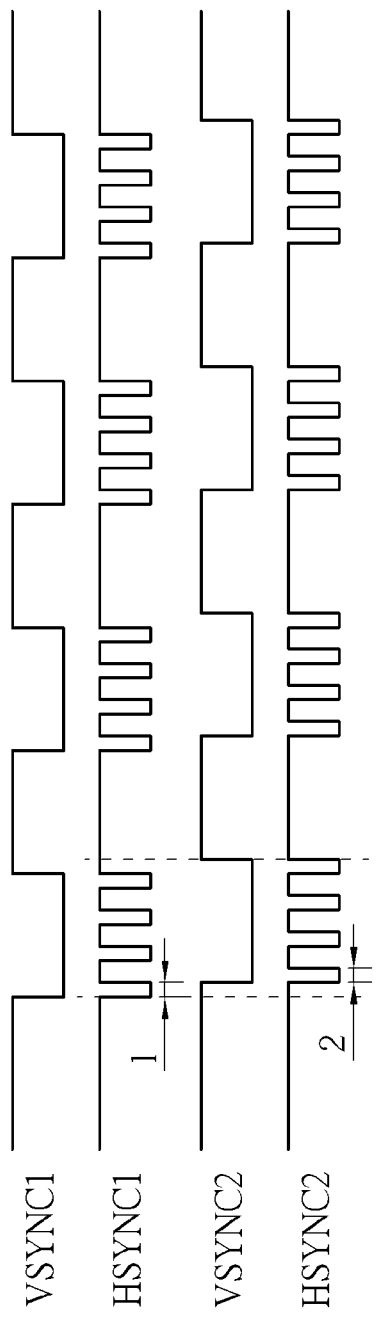
FIG. 5B is a diagram illustrating the timing relationship between the synchronization signals generated by the image sensor and the synchronization signals generated by the image sensor of the output image generating method shown in FIG. 5A.
Figure 5C:
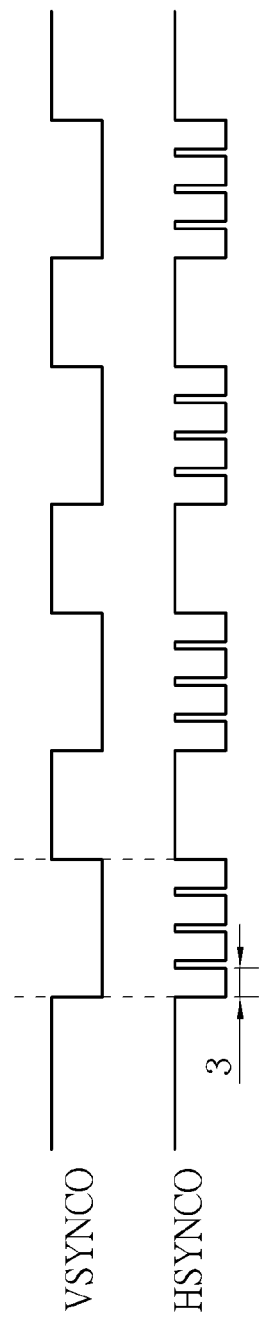
FIG. 5C is a diagram illustrating the synchronization signals corresponding to the output images.

Please refer to FIG. 5A, which is a diagram illustrating yet another output image generating method of the video generation system according to the present invention, wherein the first images Frame_$1_i$ generated by the image sensor 210_1 are arranged to be the left halves of the output images Frame_$O_i$, and the second images Frame_$2_i$ generated by the image sensor 210_2 are arranged to be the right halves of the output images Frame_$O_i$. The details are as follows. The combining circuit 220 would receive one scan line of the image Frame_$2_i$ generated by the image sensor 210_2 right after receiving one scan line of the image Frame_$1_i$ generated by the image sensor 210_1, and continue to receive scan lines in this order. Besides, the combining circuit 220 outputs the scan line of the image Frame_$1_i$ as the left half of one scan line of the image Frame_$O_i$ while receiving it, and similarly outputs the scan line of the image Frame_$2_i$ as the right half of one scan line of the image Frame_$O_i$ while receiving it. The combining circuit 220 therefore generates scan lines of the image Frame_$O_i$ sequentially. FIG. 5B is a diagram illustrating the timing relationship between the synchronization signals VSYNC1 and HSYNC1 generated by the image sensor 210_1 and the synchronization signals VSYNC2 and HSYNC2 generated by the image sensor 210_2 according to the output image generating method shown in FIG. 5A. In this embodiment, due to the fact that the image sensor 210_1 and 210_2 are scan line based and arranged to output partial image data to the combining circuit 220 in each signal output, there would be overlapping of the synchronization pulses of the vertical synchronization signal VSYNC1 and the synchronization pulses of the vertical synchronization signal VSYNC2. FIG. 5C is a diagram illustrating the synchronization signals VSYNCO and HSYNCO corresponding to the output images Frame_$O_i$. The horizontal synchronization pulse corresponding to a scan line of the output image Frame_$O_i$ is jointly determined in accordance with the start time of the horizontal synchronization pulse corresponding to a scan line of the Frame_$1_i$ and the end time of the horizontal synchronization pulse corresponding to a scan line of the Frame_$2_i$. That is to say, the width of the horizontal synchronization pulse of the output images Frame_$O_i$ is equal to the width of the horizontal synchronization pulse of the image Frame_$1_i$ plus the width of the horizontal synchronization pulse of the image Frame_$2_i$. The vertical synchronization pulse of the output images Frame_$O_i$ is determined in accordance with the start time of the vertical synchronization pulse of the image Frame_$1_i$ and the end time of the vertical synchronization pulse of the image Frame_$2_i$. In this embodiment, the width of the output image Frame_$O_i$ is equal to the width of the image Frame_$1_i$ plus the width of the image Frame_$2_i$, and the heights of these three images are the same.

Figure 6A:
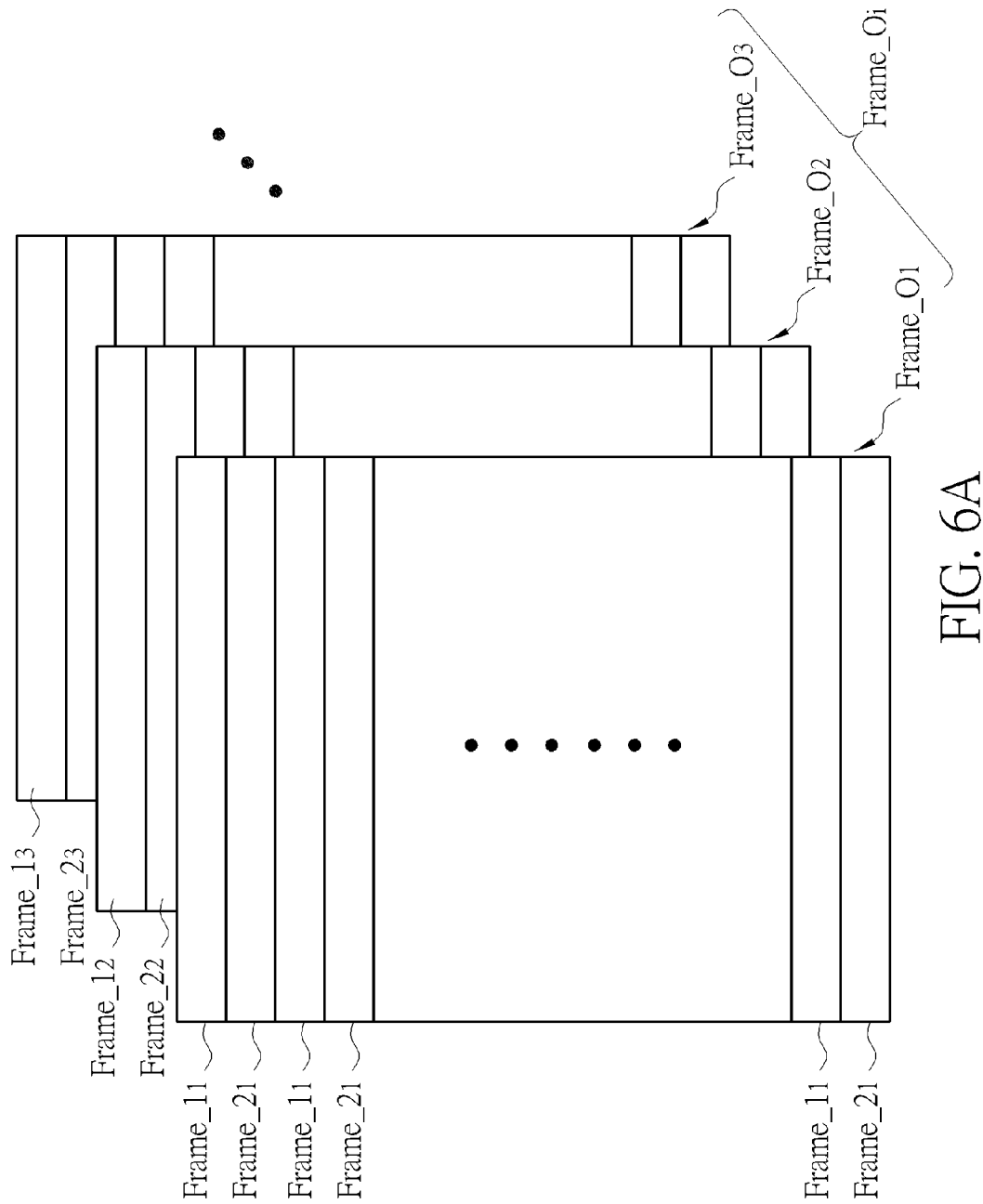
FIG. 6A is a diagram illustrating yet another output image generating method of the video generation system according to the present invention.
Figure 6B:
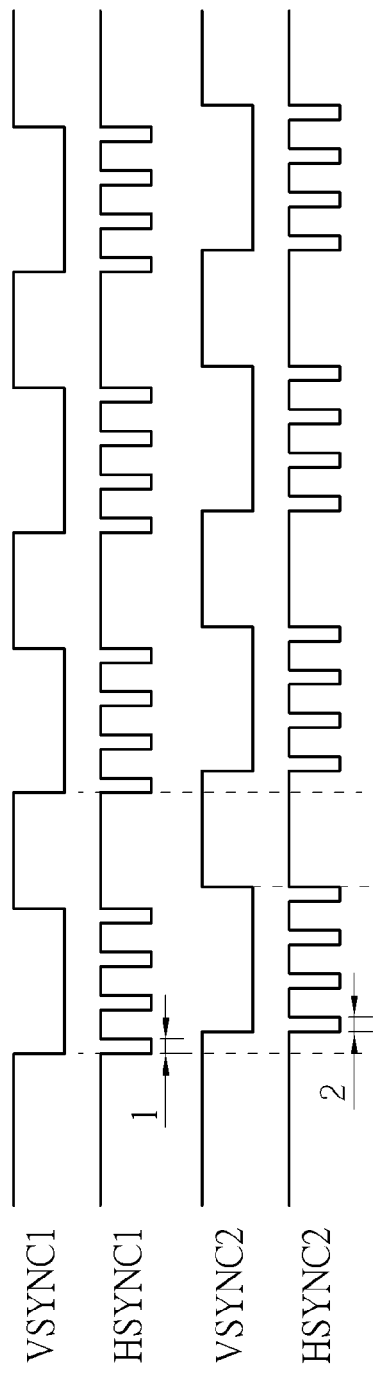
FIG. 6B is a diagram illustrating the timing relationship between the synchronization signals generated by the image sensor and the synchronization signals generated by the image sensor of the output image generating method shown in FIG. 6A.
Figure 6C:
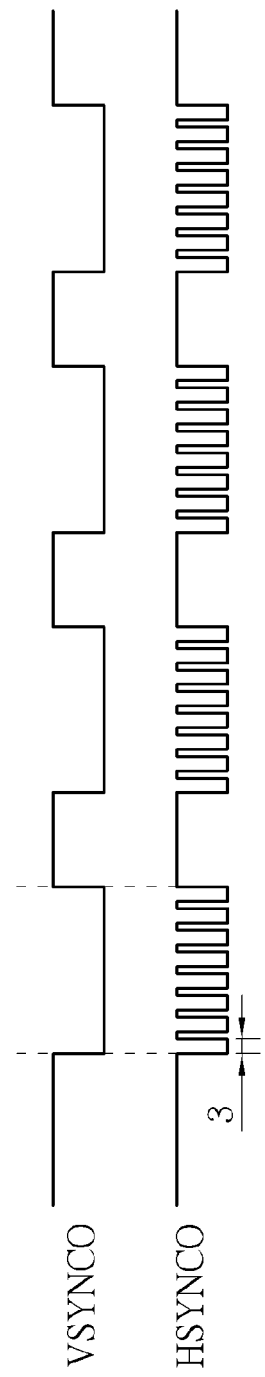
FIG. 6C is a diagram illustrating the synchronization signals corresponding to the output images.

Please refer to FIG. 6A, which is a diagram illustrating yet another output image generating method of the video generation system according to the present invention, wherein the scan lines of the image Frame_$1_i$ generated by the image sensor 210_1 are arranged to odd scan lines of the output images Frame_$O_i$, and the scan lines of the images Frame_$2_i$ generated by the image sensor 210_2 are arranged to be even scan lines of the output images Frame_$O_i$. The details are as follows. The combining circuit 220 would output one scan line of the image Frame_$1_i$ generated by the image sensor 210_1 as one scan line of the output images Frame_O$_i$ immediately after receiving it, and then output one scan line of the image Frame_2$_i$ generated by the image sensor 210_2 as one scan line of the output images Frame_O$_i$ immediately after receiving it. In this way, the combining circuit 220 outputs each scan line of the output images Frame_O$_i$. FIG. 6B is a diagram illustrating the timing relationship between the synchronization signals VSYNC1 and HSYNC1 generated by the image sensor 210_1 and the synchronization signals VSYNC2 and HSYNC2 generated by the image sensor 210_2 according to the output image generating method shown in FIG. 6A. In this embodiment, due to the fact that the image sensors 210_1 and 210_2 are scan line based and arranged to output partial image data to the combining circuit 220 in each signal output, there would be overlapping of the synchronization pulses of the vertical synchronization signal VSYNC1 and the synchronization pulses of the vertical synchronization signal VSYNC2. FIG. EC is a diagram illustrating the synchronization signals VSYNCO and HSYNCO corresponding to the output images Frame_O$_i$. The horizontal synchronization pulse corresponding to a scan line of the output image Frame_O$_i$ is determined in accordance with the horizontal synchronization pulse corresponding to a scan line of the Frame_1$_i$ or the horizontal synchronization pulse corresponding to a scan line of the Frame_2$_i$. That is to say, the widths of the horizontal synchronization pulse of the output images Frame_O$_i$, the image Frame_1$_i$ and the image Frame_2$_i$ are the same, and the horizontal synchronization pulse corresponding to each odd scan line of the output image Frame_O$_i$ is generated based on the horizontal synchronization pulse corresponding to each scan line of the image Frame_1$_i$, and the horizontal synchronization pulse corresponding to each even scan line of the output images Frame_O$_i$ is generated based on the horizontal synchronization pulse corresponding to each scan line of the image Frame_2$_i$. The vertical synchronization pulse of the output images Frame_O$_i$ is determined in accordance with the start time of the vertical synchronization pulse of the image Frame_1$_i$ and the end time of the vertical synchronization pulse of the image Frame_2$_i$. In this embodiment, the height of the output image Frame_O$_i$ is equal to the height of the image Frame_1$_i$ plus the height of the image Frame_2$_i$, and the widths of these three images are the same.

It should be noted that, although the above description only mentions how to combine images generated by the two image sensors, this is not a limitation of the present invention. Those skilled in that art may further extend the above-mentioned combining method of generating the output images to more than two image sensors. For instance, in the embodiment shown in FIG. 4A, the combining circuit 220 may be configured to utilize the images Frame_1$_i$ generated by the first image sensor 210_1 to be the upper half (top half) of the output images Frame_O$_i$, the images Frame_2$_i$ generated by the second image sensor 210_2 to be the middle half of the output images Frame_O$_i$, and the image Frame_3$i$ generated by the third image sensor 210_3 to be the lower half (bottom half) of the output images Frame_O$_i$, and may be further configured to generate the synchronization signal corresponding to the output images Frame_O$_i$ according to synchronization signals corresponding to the images Frame_1$_i$, Frame_2$_i$, Frame_3$_i$. Designs based on the above alternatives and other further extensions all fall within the scope of the present invention. In addition, the output image generation methods shown in the different embodiments can also be employed jointly. For example, employing the methods shown in FIG. 4A and FIG. 5A at the same time to obtain a 3-by-3 grid output image is feasible.

In order to produce a variety of output images mentioned above and the corresponding synchronization signals under a premise of a simplified signal transmission interface, the present invention provides a plurality of bus architectures and associated control methods, thereby achieving the purpose of sharing the signal transmission interface and reducing the performance requirement of the combining circuit.

Figure 7:
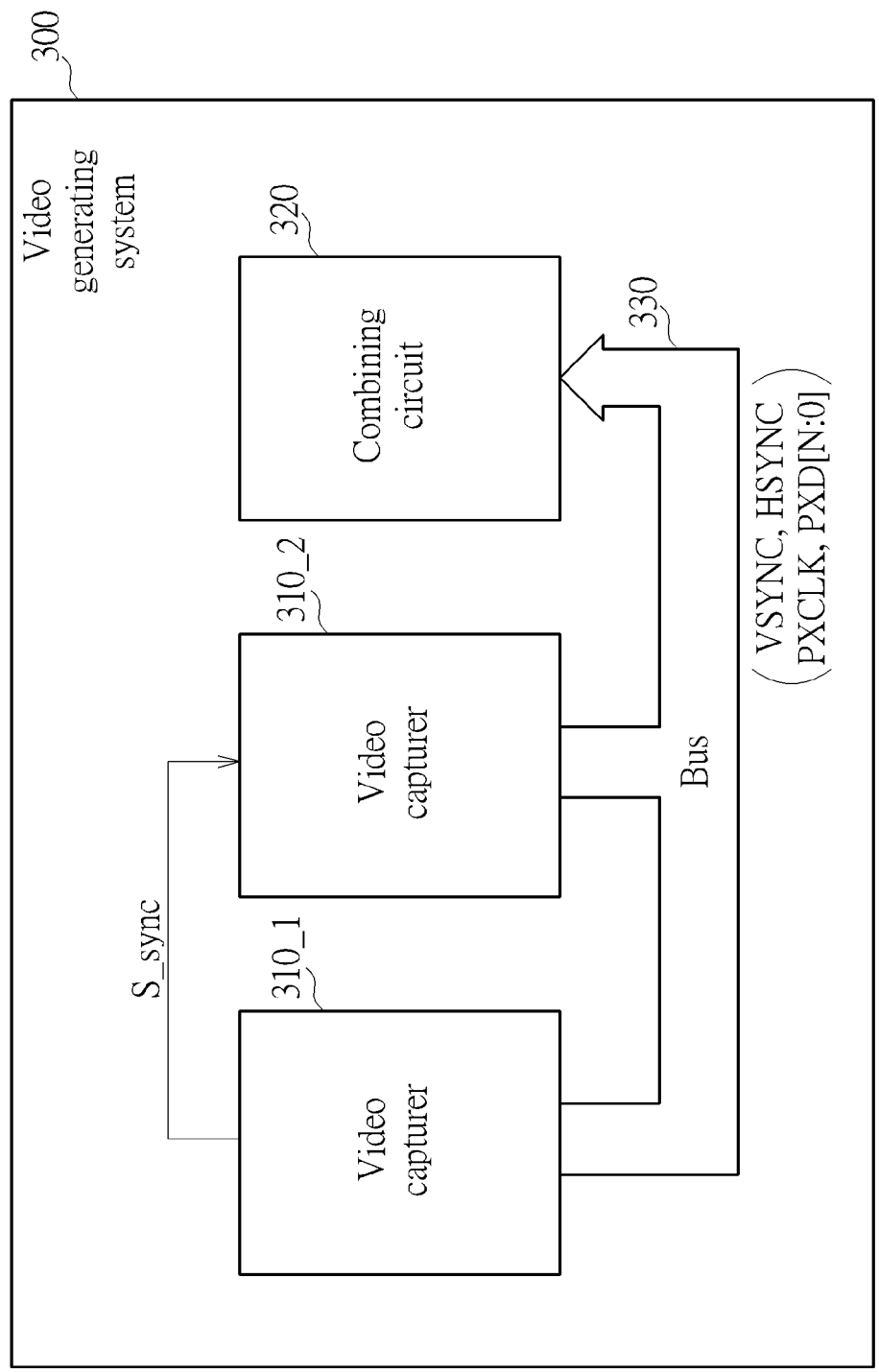
FIG. 7 is a diagram illustrating bus control architecture of the video generating system according to a first embodiment of the present invention.
Figure 8:
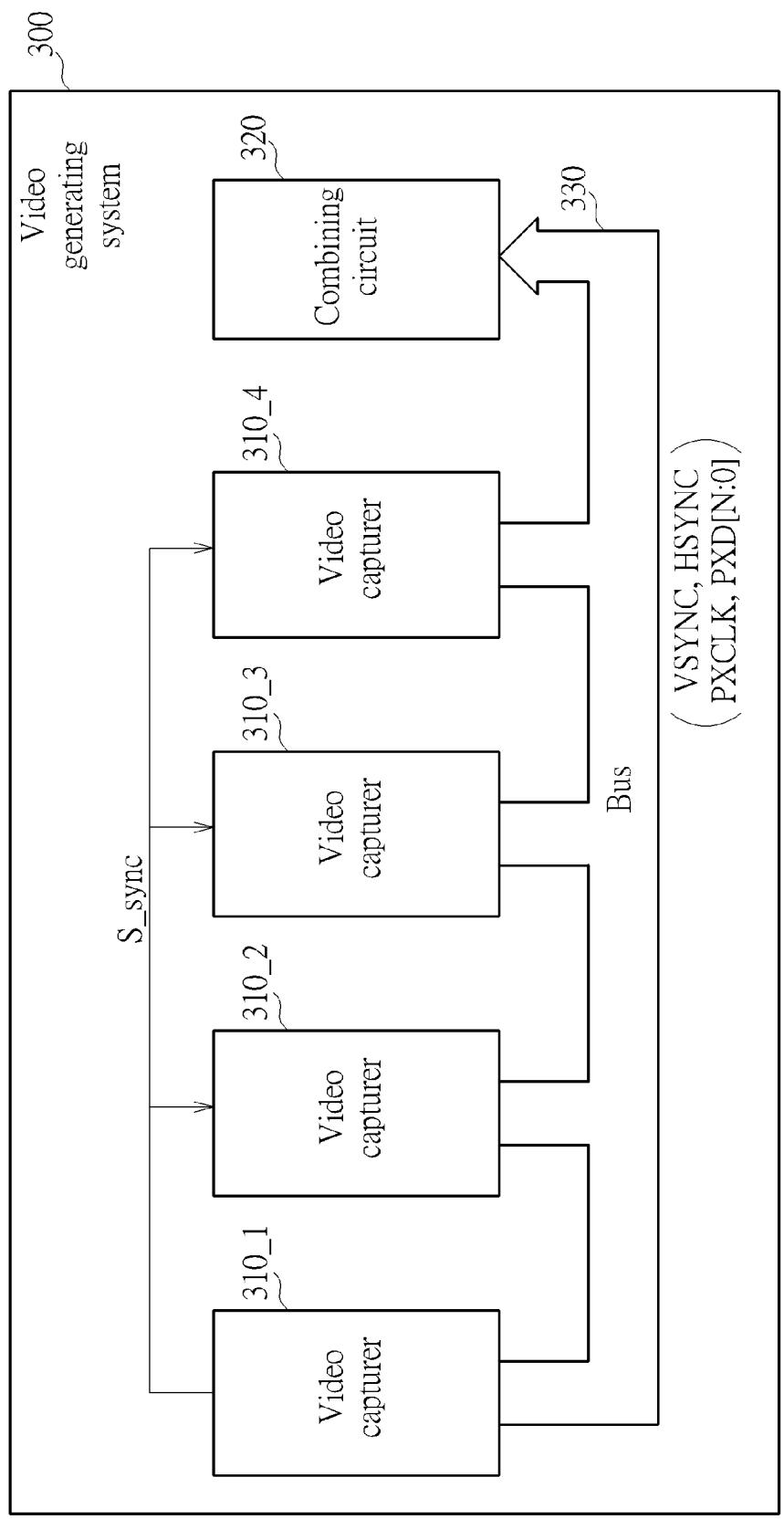
FIG. 8 is a diagram illustrating bus control architecture of the video generating system according to a second embodiment of the present invention.

First, please refer to FIG. 7, which is a diagram illustrating a bus control architecture of the video generating system according to an embodiment of the present invention. As shown in FIG. 7, the video generating system 300 includes an image sensor 310_1, an image sensor 310_2, and a combining circuit 320. There is a bus 330 between the image sensor 310_1, the image sensor 310_2, and the combining circuit 320. The bus 330 includes signal lines VSYNC, HSYNC, PXCLK for transmitting synchronization signals, and an N-bit signal line PXD for transmitting pixel data (i.e., image data). The image sensor 310_1 and the image sensor 310_2 transmit signals, such as the synchronization signal, the pixel data, and the pixel clock, to the combining circuit 320 via the bus 330. For instance, the image sensor 310_1 may transmit the horizontal synchronization signal and vertical synchronization signal to the combining circuit 320 through the signal lines VSYNC and HSYNC, transmit the pixel clock to the combining circuit 320 for synchronization through the signal line PXCLK, and transmit the pixel data corresponding to the Frame_1$_i$ to the combining circuit 320 through the signal line PXD. In this architecture, the image sensor 310_1 is arranged to be a master device in charge of the determination of the usage right of the bus 330. When the image sensor 310_1 finishes using the bus 320, the image sensor 310_1 would transmit a control signal S_sync to the image sensor 310_2 for allowing the image sensor 310_2 to transmit the synchronization signals VSYNC2 and HSNYC2, the pixel clock corresponding to the Frame_2$_i$, and the pixel data to the combining circuit 320 via the bus 330. The wait time of the image sensor 310_1 can be predetermined in accordance with the operational characteristics of the image sensor 310_2. For example, the wait time may be equal to a time period of one transmission performed by the image sensor 310_2 via the bus 330. When the wait time is expired, the image sensor 310_1 may perform the next transmission. The above-mentioned architecture may be applied to any of the output image generating methods shown in FIGS. 3A-6A, and those skilled in the art will readily understand it through the following embodiments. For instance, when this architecture is applied to the embodiment of FIG. 5A, after completing the transmission of the pixel data, the pixel clock, and the corresponding synchronization signals of a specific scan line of the image Frame_1$_i$, the image sensor 310_1 would transmit the control signal S_sync to the image sensor 310_2 for allowing the image sensor 310_2 to transmit the pixel data of a specific scan line of the image Frame_2$_i$ via the bus 330. After the predetermined wait time is expired, the image sensor 310_1 would start to deal with the transmission of the pixel data, the pixel clock, and the corresponding synchronization signals of the next scan line. The above procedure is performed repeatedly till the end of the image data transmission. If the video generating system 300 includes more than two image sensors, please refer to the embodiment shown in FIG. 8, wherein the video generating system 300 similarly generates the control signal S_sync to the image sensors 310_2-310_4 through the image sensor 310_1 (which acts as the master device) to determine the usage right of the bus 330.

Figure 9:
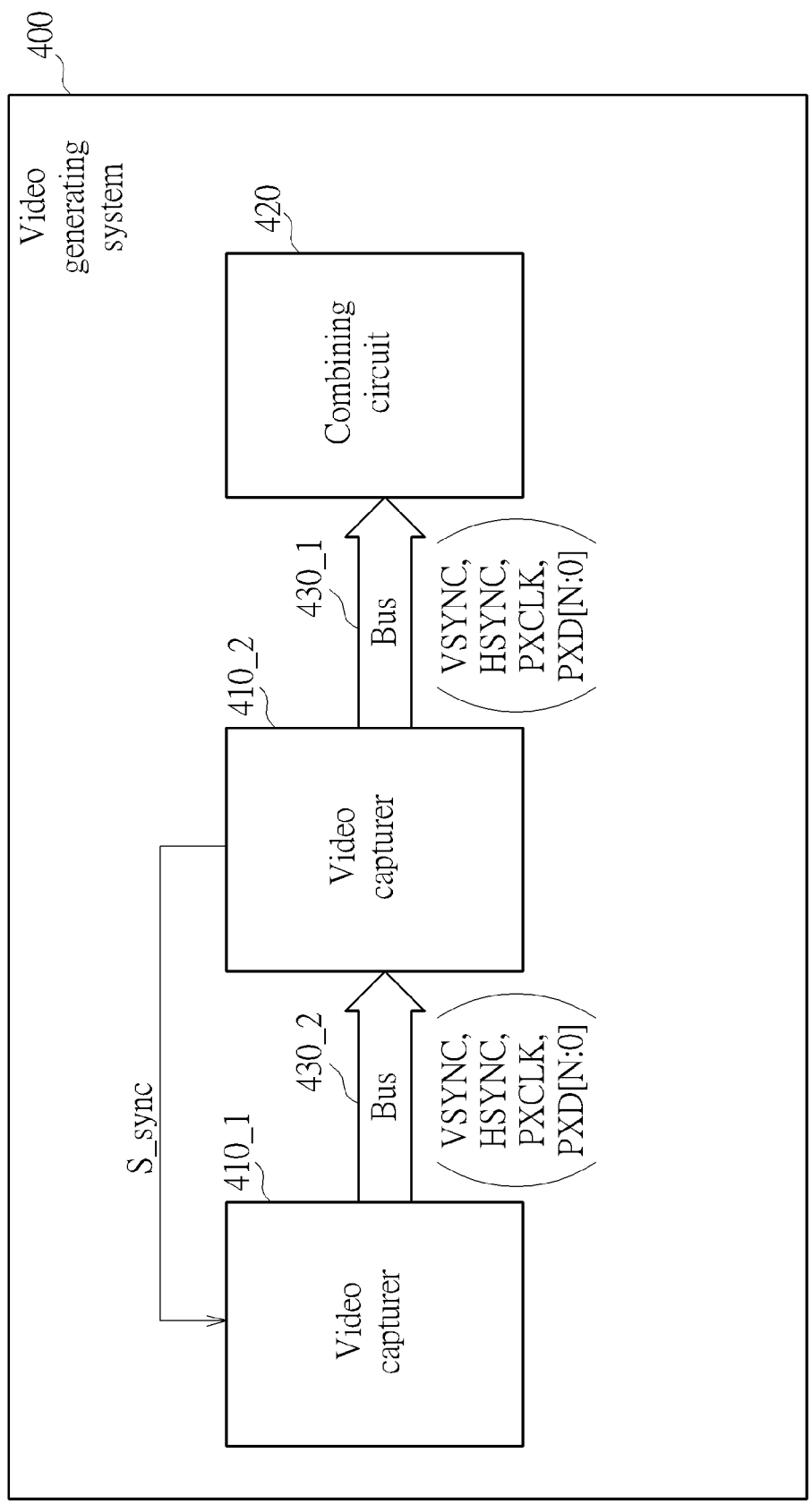
FIG. 9 is a diagram illustrating bus control architecture of the video generating system according to a third embodiment of the present invention.
Figure 10:
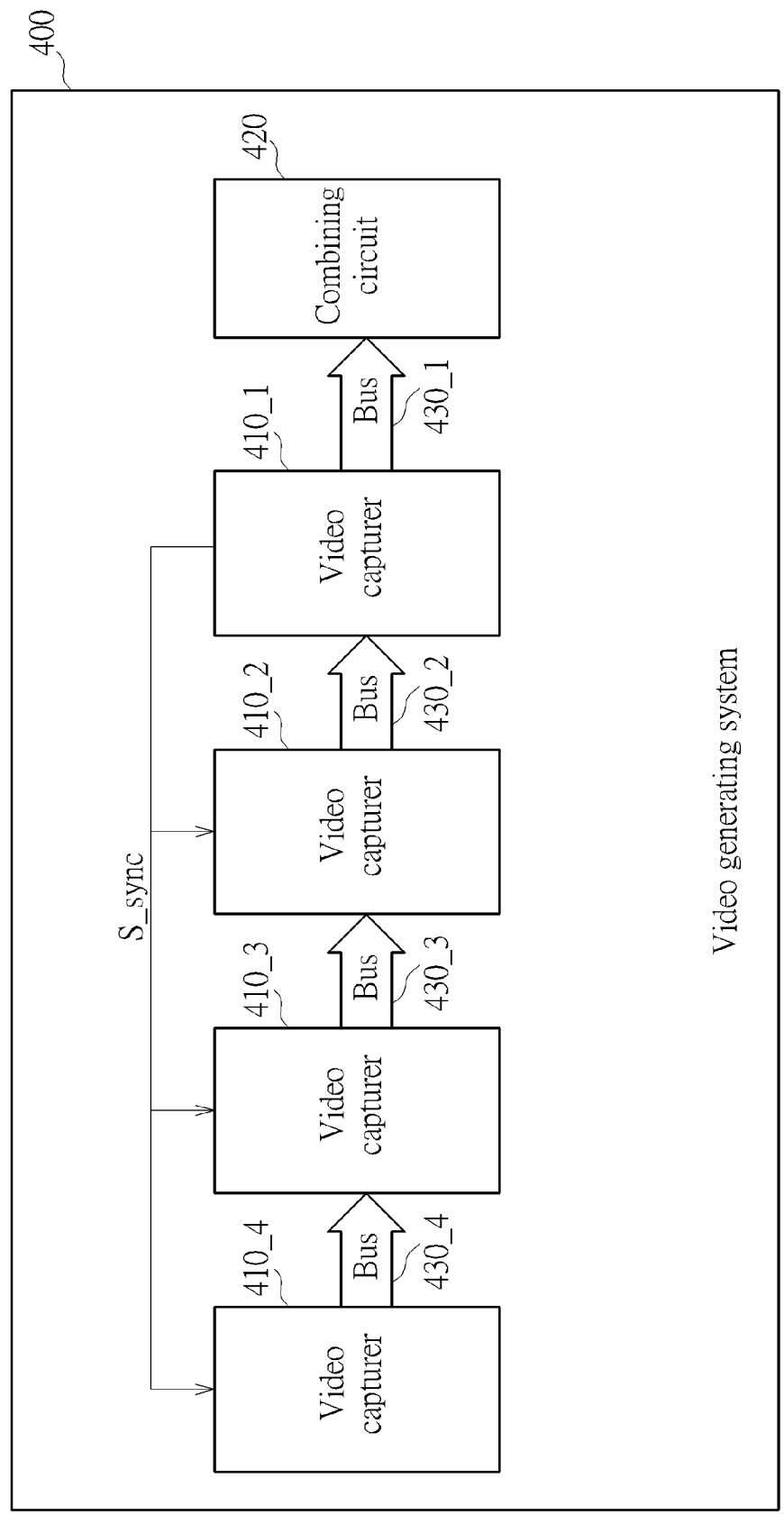
FIG. 10 is a diagram illustrating bus control architecture of the video generating system according to a fourth embodiment of the present invention.

Please refer to FIG. 9, which is a diagram illustrating another bus control architecture of the video generating system according to an embodiment of the present invention. As shown in FIG. 9, the video generating system 400 includes an image sensor 410_1, an image sensor 410_2, and a combining circuit 420. In this architecture, there are buses 430_1 and 430_2, each including signal lines VSYNC, HSYNC, PXCLK for transmitting synchronization signals, and an N-bit signal line PXD for transmitting pixel data. The image sensor 410_2 transmits signals, such as the synchronization signal, the pixel data, and the pixel clock, to the image sensor 410_1 via the bus 430_2, and the image sensor 410_1 transmits the synchronization signal, the pixel data, and the pixel clock to the combining circuit 420 through the bus 430_1. A daisy chain signal transmission design is employed in this architecture, thus avoiding the problem probably induced by sharing a bus. In addition, the image sensor 410_1 may determine the timing at which the image sensor 410_2 can transmit the synchronization signal, the pixel data, and the pixel clock to the image sensor 410_1 via the bus 430_2, thereby avoiding the image sensor 410_2 from transmitting the image Frame_$2_i$ to the combining circuit 420 while the image sensor 410_1 is currently transmitting the image Frame_$1_i$ to the combining circuit 420. When the image sensor 410_1 receives the synchronization signal, the pixel data, and the pixel clock transmitted by the image sensor 410_2 through the bus 430_2, it will simultaneously transmit the above signals to the combining circuit 420 via the bus 430_1. Hence, there would be no memory needed inside the image sensor 410_1 for buffering the pixel data. Furthermore, this architecture could be extended to a video generating system including more than two image sensors. Please refer to the embodiment shown in FIG. 10. There are buses 430_1-430_4 disposed between the image sensors 410_1-410_4 for transmitting the synchronization signal, the pixel data, and the pixel clock to the combining circuit 420 through the daisy chain signal transmission manner. The image sensor 410_1 transmits the control signal S_sync to the image sensors 410_2-410_4 to determine the timing of signal transmission. Similarly, the output images shown in FIG. 3A-FIG. 6A and alternative designs thereof could also be produced according to the aforementioned architectures.

Figure 11:
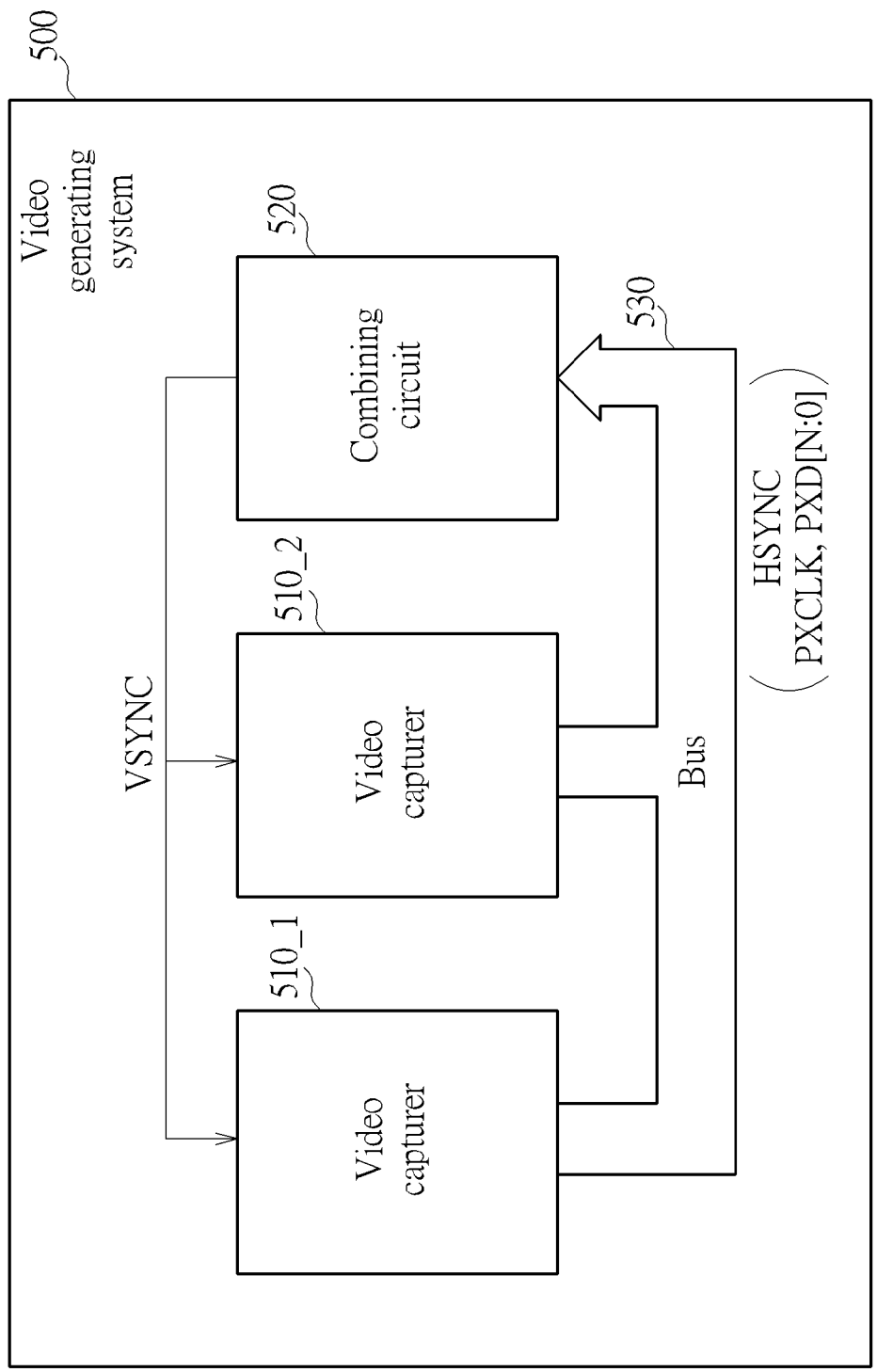
FIG. 11 is a diagram illustrating bus control architecture of the video generating system according to a fifth embodiment of the present invention.

First, please refer to FIG. 11, which is a diagram illustrating yet another bus control architecture according to an embodiment of the present invention. As shown in FIG. 11, the video generating system 500 includes an image sensor 510_1, an image sensor 510_2, and a combining circuit 520. There is a bus 530 coupled to the image sensor 510_1, the image sensor 510_2, and the combining circuit 520. The bus 530 includes signal lines VSYNC, HSYNC, PXCLK for transmitting synchronization signals, and an N-bit signal line PXD for transmitting pixel data. The image sensor 510_1 and the image sensor 510_2 transmit data, such as the synchronization signal, the pixel data, and the pixel clock, to the combining circuit 520 via the bus 530. The difference between this architecture and the above architecture is that the usage right of the bus 530 is determined by the combining circuit 520. The combining circuit 520 transmits the control signal to the image sensors 510_1 and 510_2 via the signal line VSYNC of the bus 330, to determine which image sensor is granted to use the bus 530 to transmit data, such as the synchronization signal (e.g., HSYNC1, HSYNC2), the pixel data, and the pixel clock, to the combining circuit 520. Besides, the combining circuit 520 would directly generate the output vertical synchronization signal VSYNCO. To put it another way, the combining circuit 520 determines the timing of the vertical synchronization beforehand, and receives and outputs the images Frame_$1_i$ and Frame_$2_i$ sequentially to produce the output images Frame_$O_i$ after generating the control signal S_sync. The advantage of this architecture is that the control signal S_sync can be transmitted without additional pins or signal lines. Similarly, the output images shown in FIG. 3A-FIG. 6A and alternative designs thereof could also be produced according to this architecture.

Figure 12:
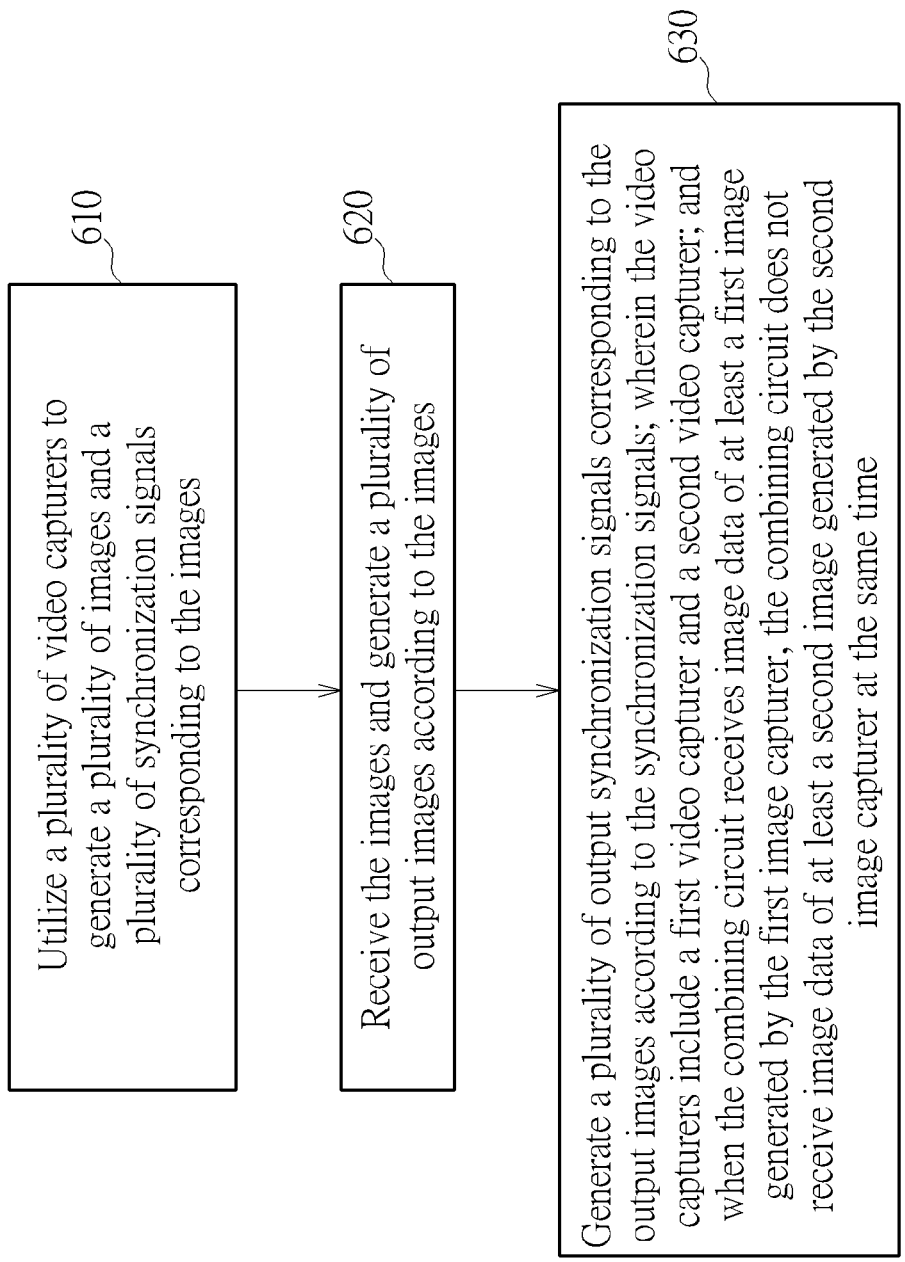
FIG. 12 is a flowchart illustrating a video generating method according to an embodiment of the present invention.

Please refer to FIG. 12, which is a flowchart illustrating a video generating method according to another embodiment of the present invention. Provided that substantially the same result is achieved, the steps of the flowchart shown in FIG. 12 need not be in the exact order shown and need not be contiguous, that is, other steps can be intermediate. Besides, some steps in FIG. 12 may be omitted according to various embodiments or requirements. The method may be briefly summarized as follows.

Step 610: Utilize a plurality of image sensors to generate a plurality of images and a plurality of synchronization signals corresponding to the images;

Step 620: Receive the images and generate a plurality of output images according to the images; and Step 630: Generate a plurality of output synchronization signals corresponding to the output images according to the synchronization signals; wherein the image sensors include a first image sensor and a second image sensor; and when the combining circuit receives image data of at least a first image generated by the first image sensor, the combining circuit does not receive image data of at least a second image generated by the second image sensor at the same time.

Many embodiments and drawings mentioned above have explained the principle, details and derivative changes of the video generating method of the present invention. Therefore, further descriptions of the video generating method of the present invention are omitted here for brevity.

The term "one embodiment" mentioned above represents a particular feature, structure, or characteristic described for the embodiment are included in at least one implementation of the present invention. Furthermore, the term "one embodiment" appears in different paragraphs represents a different embodiment. Therefore, although different structural features or methods are described for the different embodiments described above, but it should be noted that these different characteristics may be implemented on the same specific embodiment through appropriate modifications.

In summary, by sharing the signal transmission interface and controlling the synchronization signals appropriately, the disclosed video generating system and the video generating method can significantly reduce the complexity of the signal transmission interface of the video system with multiple image sensors as well as the performance requirement of the back-end combining circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video generating system, comprising:
a plurality of image sensors, arranged to generate a plurality of images and a plurality of synchronization signals corresponding to the images;
a combining circuit, coupled to the image sensors, arranged to generate a plurality of output images according to the images, and generate a plurality of output synchronization signals corresponding to the output images according to the synchronization signals; and
a bus, coupled between the image sensors and the combining circuit, arranged to perform signal transmission;
wherein the image sensors comprise a first image sensor and a second image sensor; and when the combining circuit receives image data of at least a first image generated by the first image sensor, the combining circuit does not receive image data of at least a second image generated by the second image sensor at the same time; and the combining circuit transmits a first control signal to each of the first image sensor and the second image sensor for determining when the first image sensor is allowed to utilize the bus to perform signal transmission with the combining circuit and determining when the second image sensor is allowed to utilize the bus to perform signal transmission with the combining circuit.

2. The video generating system of claim 1, wherein the first image sensor further transmits a second control signal to the second image sensor for determining when the second image sensor is allowed to utilize the bus to perform signal transmission with the combining circuit.

3. A video generating system, comprising:
a plurality of image sensors, arranged to generate a plurality of images and a plurality of synchronization signals corresponding to the images;
a combining circuit, coupled to the image sensors, arranged to generate a plurality of output images according to the images, and generate a plurality of output synchronization signals corresponding to the output images according to the synchronization signals;
a first bus, coupled between a first image sensor of the image sensors and the combining circuit, arranged to perform signal transmission; and
a second bus, coupled between a second image sensor of the image sensors and the first image sensor, arranged to perform signal transmission between the first image sensor and the second image sensor;
wherein when the combining circuit receives image data of at least a first image generated by the first image sensor, the combining circuit does not receive image data of at least a second image generated by the second image sensor at the same time.

4. The video generating system of claim 3, wherein the first image sensor transmits a control signal to the second image sensor for determining when the second image sensor is allowed to utilize the second bus to perform signal transmission with the first image sensor; and the first image sensor utilizes the first bus to transmit a signal received from the second bus to the combining circuit.

5. The video generating system of claim 4, wherein the image sensors further comprises a third image sensor; and the video generating system further comprises:
a third bus, coupled between the second image sensor and the third image sensor;
wherein the first image sensor transmits a control signal to the third image sensor for determining when the third image sensor is allowed to utilize the third bus to perform signal transmission with the second image sensor; and the second image sensor utilizes the second bus to transmit a signal received from the third bus to the first image sensor.

* * * * *